J. F. LAMB.
ELECTRICALLY HEATED UTENSIL.
APPLICATION FILED DEC. 16, 1912.

1,060,267.

Patented Apr. 29, 1913.

WITNESSES
Louis Lucia.
Ann E. O'Brien.

INVENTOR
Joseph F. Lamb.
BY
N. E. Hart
his ATTORNEY

UNITED STATES PATENT OFFICE.

JOSEPH F. LAMB, OF NEW BRITAIN, CONNECTICUT, ASSIGNOR TO LANDERS, FRARY & CLARK, OF NEW BRITAIN, CONNECTICUT, A CORPORATION OF CONNECTICUT.

ELECTRICALLY-HEATED UTENSIL.

1,060,267. Specification of Letters Patent. Patented Apr. 29, 1913.

Application filed December 16, 1912. Serial No. 737,118.

*To all whom it may concern:*

Be it known that I, JOSEPH F. LAMB, a citizen of the United States, and a resident of New Britain, in the county of Hartford and State of Connecticut, have invented certain new and useful Improvements in Electrically-Heated Utensils, of which the following is a specification.

The object of the invention is to provide means for utilizing substantially all of the heat generated by the unit to effect the heating of the utensil and to provide for maintaining a perfect heat conducting relation between the unit or parts thereof and the utensil during its operation.

Figure 1:
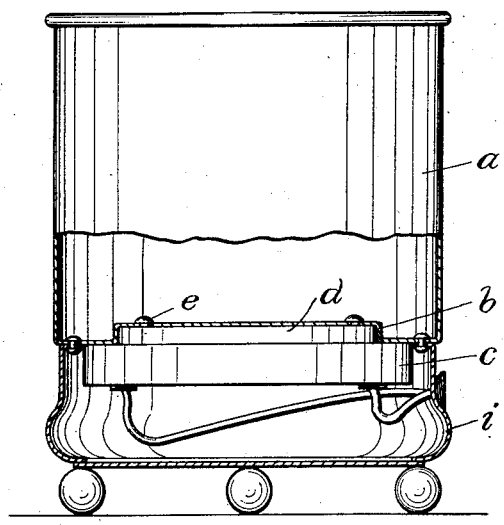
Figure 2:
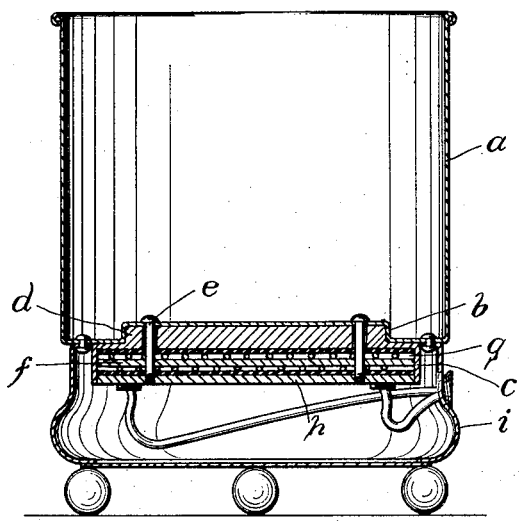

In the drawings Figure 1 is a side view showing part of the utensil in section. Fig. 2 is a sectional view of the complete heating element.

The invention as illustrated is embodied in a receptacle which is indicated at $a$, having a socket $b$; $c$ is a holder for the electrical heater made of heat conducting material and having a plug $d$ which fits closely within the socket, screws $e$ holding the holder in position.

$f$ is the heater, which is of the resistance type, located within a recess $g$ in the holder and covered by the heat conducting plate $h$ which is fitted within the recess, the heater and plate being secured in the holder in any convenient manner. When current is turned into the heater, the holder becomes hot, the plug swells and binds itself into the socket in the receptacle, perfecting and maintaining the heat conductive relation between the plug and the utensil. The plate $h$ also expands under the heat, and swells to a tight fit in the holder. Preferably an air-tight pocket is formed about the holder as by the base $i$ to prevent the loss of heat. It will thus be seen that the expansion or distortion of the plate $h$ and the plug $d$ when heated tends to make more perfect the heat conducting path from the heater to the utensil without the aid of any mechanical clamping or securing devices.

I claim as my invention:

1. The combination with a utensil provided with a socket, of an electrical heater and a holder therefor, said holder being formed of heat conducting material, and a plug on said holder closely fitting the socket and adapted when heated to swell and completely fill the socket and establish more efficient heat conductive relation with the wall thereof.

2. The combination with a utensil provided with a socket, of a holder provided with a plug fitting in the socket and adapted under heat to expand and fill the socket, said holder being provided with a recess, an electrical heater located in the recess, and a plate of conducting material located against the heater and within the recess, and adapted under heat to expand into intimate contact with the walls of the recess.

JOSEPH F. LAMB.

Witnesses:
J. A. LINDSAY,
C. E. CRANE.

Copies of this patent may be obtained for five cents each, by addressing the "Commissioner of Patents, Washington, D. C."